United States Patent
Clapp, Jr. et al.

(10) Patent No.: US 6,792,191 B1
(45) Date of Patent: Sep. 14, 2004

(54) LOCAL CONVERGENCE CABINET

(75) Inventors: Donnie R. Clapp, Jr., Saginaw, TX (US); Kevin L. Strause, Keller, TX (US); Kelly J. Smith, Willow Park, TX (US)

(73) Assignee: Corning Cable Systems LLC, Hickory, NC (US)

( * ) Notice: Subject to any disclaimer, the term of this patent is extended or adjusted under 35 U.S.C. 154(b) by 7 days.

(21) Appl. No.: 10/420,687

(22) Filed: Apr. 22, 2003

(51) Int. Cl.[7] ............................................. G02B 6/00
(52) U.S. Cl. ...................................................... 385/135
(58) Field of Search ................................ 385/134, 135, 385/136, 137

(56) References Cited

U.S. PATENT DOCUMENTS 6,504,989 B1 * 1/2003 Gooding ..................... 385/135
6,621,975 B2 * 9/2003 Laporte et al. ............. 385/135
6,661,961 B1 * 12/2003 Allen et al. ................. 385/135
6,711,339 B2 * 3/2004 Puetz et al. ................. 385/135

* cited by examiner

Primary Examiner—Khiem Nguyen
(74) Attorney, Agent, or Firm—Christopher C. Dremann (57) ABSTRACT

An outdoor cabinet interconnects an optical fiber of a feeder cable with at least two optical fibers of a distribution cable at a local convergence point in an optical network. The cabinet defines an interior compartment comprising a feeder cable side having a feeder cable entry port and a feeder cable slack storage area, a distribution cable side having a distribution cable entry port and a distribution cable slack storage area, at least one splice tray and at least one coupler module. A feeder pigtail is routed from the splice tray and connected to an adapter provided on the coupler module. At least two distribution pigtails are routed from the splice tray and connected to adapters provided on the coupler module. The coupler module splits an optical signal carried on the optical fiber of the feeder cable into optical signals carried on the optical fibers of the distribution cable.

20 Claims, 7 Drawing Sheets

LOCAL CONVERGENCE CABINET

FIELD OF THE INVENTION

The present invention relates generally to enclosures for interconnecting at least one optical fiber of a feeder cable with two or more optical fibers of a distribution cable. More particularly, the invention relates to an outdoor cabinet comprising at least one coupler module for splitting an optical signal carried by an optical fiber of a feeder cable into optical signals carried on two or more optical fibers of a distribution cable at a local convergence point in an optical network.

BACKGROUND OF THE INVENTION

Telecommunications service providers are currently developing networks consisting entirely of fiber optic components to meet the demand for high bandwidth communications service to businesses and homes. These "all-optical" telecommunications networks require a series of service enclosures, referred to herein as "cabinets," along the network that are located at access points in the field. Each such location is referred to herein as a "local convergence point" and each such cabinet is referred to herein as a "local convergence cabinet (LCC)." An LCC is utilized at a local convergence point to interconnect an optical fiber of a feeder cable from a service provider with two or more optical fibers of at least one distribution cable. In some instances, an optical fiber of the feeder cable is connected to two or more optical fibers of drop cables that are routed directly to the businesses or homes of subscribers of the communications service. In other instances, an optical fiber of the feeder cable is connected to two or more optical fibers of a cable that is routed from the LCC to yet another local convergence point along the optical network to serve as a further feeder cable for additional drop cables. The further feeder cable is sometimes referred to in the art as a "branch" cable. The optical network may be configured in many different ways, but typically, is configured with one or more feeder cables from the service provider having optical fibers that are interconnected with optical fibers of a plurality of distribution cables at various local convergence points. The distribution cables serve as drop cables routed directly to communications equipment belonging to subscribers, or as branch cables routed to other local convergence points. As used herein, the term "distribution cable" includes both drop cables and branch cables, as those terms are commonly understood by one skilled in the art. Furthermore, the term "optical fiber" or "optical fibers" as used herein includes coated and uncoated (i.e., bare) single fibers, jacketed fibers (e.g., tight-buffered and loose buffered), multiple fibers, multiple fiber ribbons, and fiber optic cables containing one or more optical fibers.

While fiber optic networks have traditionally served as the trunk line or "backbone" of telecommunication networks to transmit signals over relatively long distances, all-optical networks are gradually being extended closer to the end points of the network. In this regard, fiber optic networks are being developed that deliver fiber-to-the-home, fiber-to-the-business, fiber-to-the-desk, and the like. In each of these applications, the LCC must be capable of interconnecting optical fibers of a feeder cable with optical fibers of distribution cables to establish the desired optical connections. In existing optical networks, the optical fibers of the feeder cable are oftentimes interconnected with optical fibers of the distribution cables within an enclosure that is mounted on a concrete pad (commonly referred to as "pad-mounted" and illustrated in FIG. 1A) or mounted on a telephone pole (commonly referred to as "pole-mounted" and illustrated in FIG. 1B). In either case, the enclosure typically includes an outdoor cabinet defining an interior compartment that is attached to a removable base. The outdoor cabinet is adapted to protect the optical fiber connections from adverse environmental effects, and if necessary, unauthorized access. At the same time, the cabinet is designed to optimize the number of connections that can be made within the cabinet. Typically, the physical size of the cabinet increases as the number of connections increases. In existing cabinets, the optical fibers of the feeder cable are interconnected (e.g., spliced) in a one-to-one relationship with the optical fibers of the distribution cables. Thus, the number of optical connections that can be made within the cabinet, commonly referred to in the art as the "fiber capacity" of the cabinet, is limited by the number of one-to-one connections (e.g., splices) that can be accomplished within the volume constraints of the cabinet. As the all-optical network proliferates, it is anticipated that the number of optical connections required to be made within a given cabinet will soon exceed the fiber capacity of conventional outdoor cabinets.

It is further anticipated that the demand for high bandwidth communications service will require the number of optical fibers of the feeder cable to increase dramatically as the all-optical network proliferates. Since many feeder cables are already installed in fiber optic cable ducts that are buried underground, and because there is oftentimes a physical or operational limit to the number of optical fibers that can be contained together within a feeder cable, there will soon be too few optical fibers from service providers to meet the increased demand for high bandwidth communications service to businesses and homes. It will therefore be necessary for service providers to install additional feeder cables within existing fiber optic cable ducts, or to invest in the construction of additional fiber optic cable ducts to carry the additional feeder cables. In certain instances, neither solution may be feasible, practical or cost effective. In any event, substantial capital expense will have to be incurred by the service provider. The capital expense incurred by the service provider ultimately will be passed on to the subscriber in the form of higher cost communications service.

As the all-optical network proliferates, there will be an increased need for a field technician to reconfigure the optical connections within the cabinet. Although spliced optical connections can be reconfigured, it is time consuming for the field technician to identify the appropriate optical fibers of the feeder cable and the distribution cable. Furthermore, it generally requires the expertise of a highly trained field technician to reconfigure the spliced optical connections in a conventional cabinet at an access point in the field. As a result, it is costly for a service provider to frequently dispatch a highly skilled field technician to reconfigure the optical connections within a conventional cabinet. Once again, the additional expense incurred by the service provider to reconfigure the spliced optical connections ultimately will be passed on to the subscriber in the form of higher cost communications service.

Accordingly, there is a need for an LCC that resolves the aforementioned difficulties associated with the inevitable proliferation of an all-optical telecommunications network. There is a further need for the optical connections within the LCC to be well organized and easily accessible to assist a less skilled field technician to identify and reconfigure the optical connections within the cabinet. The present invention solves these, as well as other, problems by providing an LCC for interconnecting at least one optical fiber of a feeder cable with two or more optical fibers of at least one distribution cable at a local convergence point in an optical network. The configuration of the LCC permits the optical connections to be organized in a space efficient manner that increases the fiber capacity of the cabinet and allows a field technician of ordinary skill to reconfigure the optical connections within the cabinet in a timely manner.

BRIEF DESCRIPTION OF THE DRAWINGS

The present invention will be described in conjunction with the accompanying drawings in which like reference numerals represent the same or similar parts in the different views. The drawings, which are incorporated in and constitute a part of this specification, provide further understanding of the invention, illustrate various embodiments of the invention, and, together with the description, help to fully explain the principles and objectives thereof.

DETAILED DESCRIPTION OF THE INVENTION

The invention is described more fully hereinafter with reference to the accompanying drawings, in which one or more exemplary embodiments of the invention are shown. The invention may, however, be embodied in many different forms, and therefore, should not be construed as being limited to the exemplary embodiments described and shown herein. The exemplary embodiments are set forth herein so that this description will be thorough and complete, and will fully convey the intended scope of the claimed invention while enabling those skilled in the art to make and practice the invention without undue experimentation.

Figure 1A:
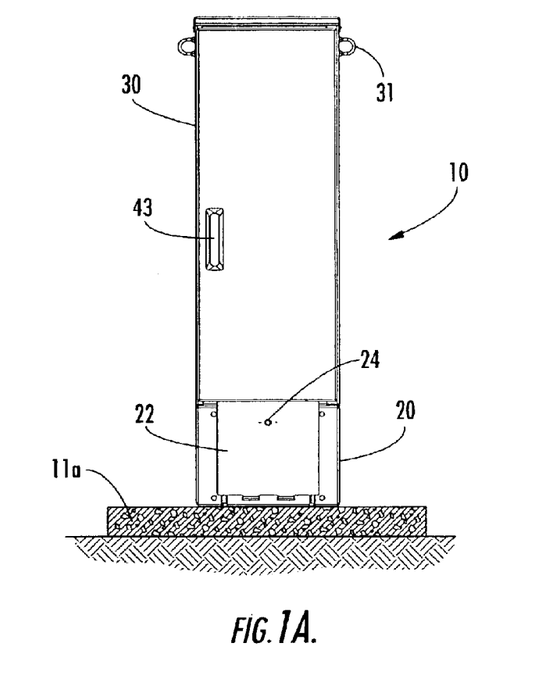
FIG. 1A is a front elevation view illustrating a Local Convergence Cabinet (LCC) constructed in accordance with the invention and mounted on a concrete pad (i.e., pad-mounted) at a local convergence point in an optical network.
Figure 1B:
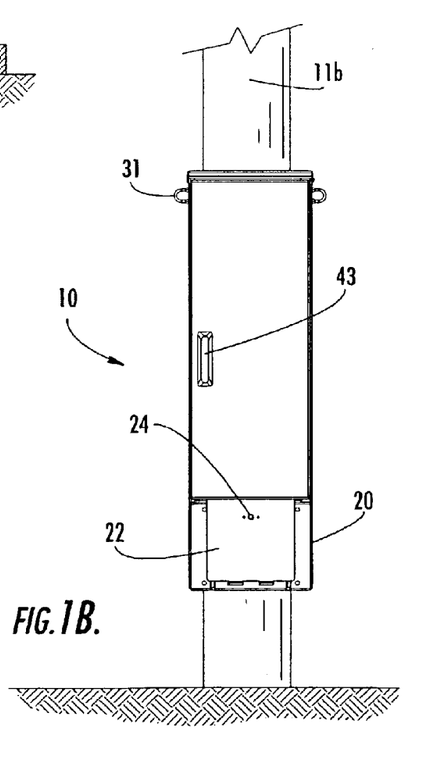
FIG. 1B is a front elevation view illustrating the LCC of FIG. 1A mounted on a telephone pole (i.e., pole-mounted) at a local convergence point in an optical network.

A Local Convergence Cabinet (LCC), indicated generally at 10, constructed in accordance with an exemplary embodiment of the invention is shown in FIG. 1A and FIG. 1B. As shown in FIG. 1A, the LCC 10 is mounted on a concrete footing, or pad, 11a poured into the earth in a known manner, and thus, is commonly referred to as "pad-mounted." As shown in FIG. 1B, the LCC 10 is mounted on a conventional utility pole 11b made of wood, composite (e.g., fiber and resin) or metal, such as a telephone pole, secured into the earth in a known manner, and thus, is commonly referred to as "pole-mounted." The LCC 10 is pad-mounted or pole-mounted at a convenient access location in an optical network for high bandwidth communications service. The LCC 10 permits an optical fiber of a feeder cable 12 (FIG. 5) to be interconnected with two or more optical fibers of at least one distribution cable 16 (FIG. 5) at a local convergence point in the optical network. As used herein, the term "local convergence point" refers to a location along the optical network that provides a field technician with access to the optical connections between the feeder cable 12 and the distribution cable 16. A typical optical network is constructed with a series of LCCs 10 along the network that interconnect optical fibers of a feeder cable with optical fibers of drop cables to provide high bandwidth communications services to homes and businesses, or with optical fibers of branch cables leading to other LCCs 10 along the network. As previously mentioned, the LCC 10 may be pad-mounted or pole-mounted, or may be disposed in a larger enclosure, such as an above-ground distribution terminal. The location and the method for locating the LCC 10 form no part of the present invention, and thus, will not be described in further detail. Regardless, the LCC 10 provides a convenient access point in the optical network for a field technician to initially install and to subsequently reconfigure the optical connections between the feeder cable 12 and the distribution cable(s) 16. Although the LCC 10 illustrated herein has an upright, rectangular, box-like shape, it may have other shapes for aesthetic purposes or to comply with local utility codes, restrictions or regulations, without departing from the intended spirit and scope of the invention.

Figure 5:
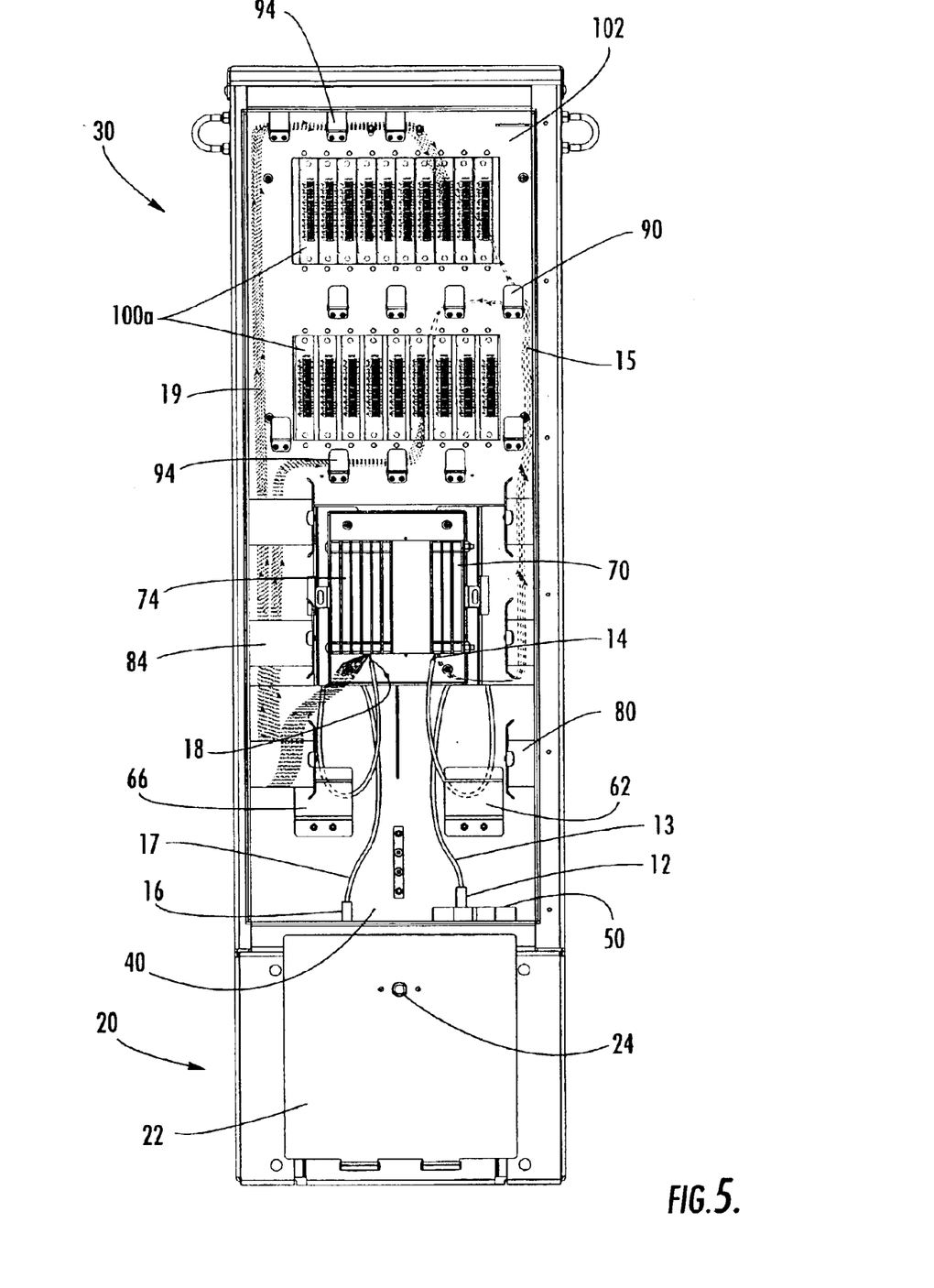
FIG. 5 is a front elevation view of the LCC of FIG. 1A illustrating an exemplary configuration of a feeder cable, a distribution cable, feeder pigtails, distribution pigtails and coupler modules installed therein.

As is well known and understood in the art, the feeder cable 12 may be a main feeder cable from the communications service provider, or may be a branch cable from a distribution terminal or another LCC 10 along the optical network. The feeder cable 12 comprises at least one, and preferably, a plurality of flexible buffer tubes 13 (FIG. 5) each containing at least one, and preferably a plurality, of optical fibers connected to communications transmission equipment from the service provider. Each distribution cable 16 comprises at least one, and preferably a plurality of flexible buffer tubes 17 (FIG. 5). The distribution cable 16 may comprise buffer tubes 17 for one or more drop cables, each containing at least one optical fiber connected to communications equipment at a subscriber's premises, such as a home or business. The distribution cable 16 may also comprise buffer tubes 17 for one or more branch cables, each containing at least one optical fiber connected, for example, to another LCC 10 along the optical network. The buffer tubes 13 of the feeder cable 12 and the buffer tubes 17 of the distribution cable 16 may contain any type, or types, of optical fibers, for example tight-buffered optical fibers, loose-buffered optical fibers, and ribbon fiber. As such, the term "optical fiber" or "optical fibers" as used herein is intended to include all types of optical transmission medium, including individual coated optical fibers, individual uncoated (i.e., bare) optical fibers, tight-buffered optical fibers, loose-buffered optical fibers, optical fibers in the form of a multi-fiber ribbon, or any other known expedient of a light transmitting fiber medium. Additionally, the optical fibers may have various diameters, including for example diameters of 900 micron, 2 mm and 3 mm.

Figure 2:
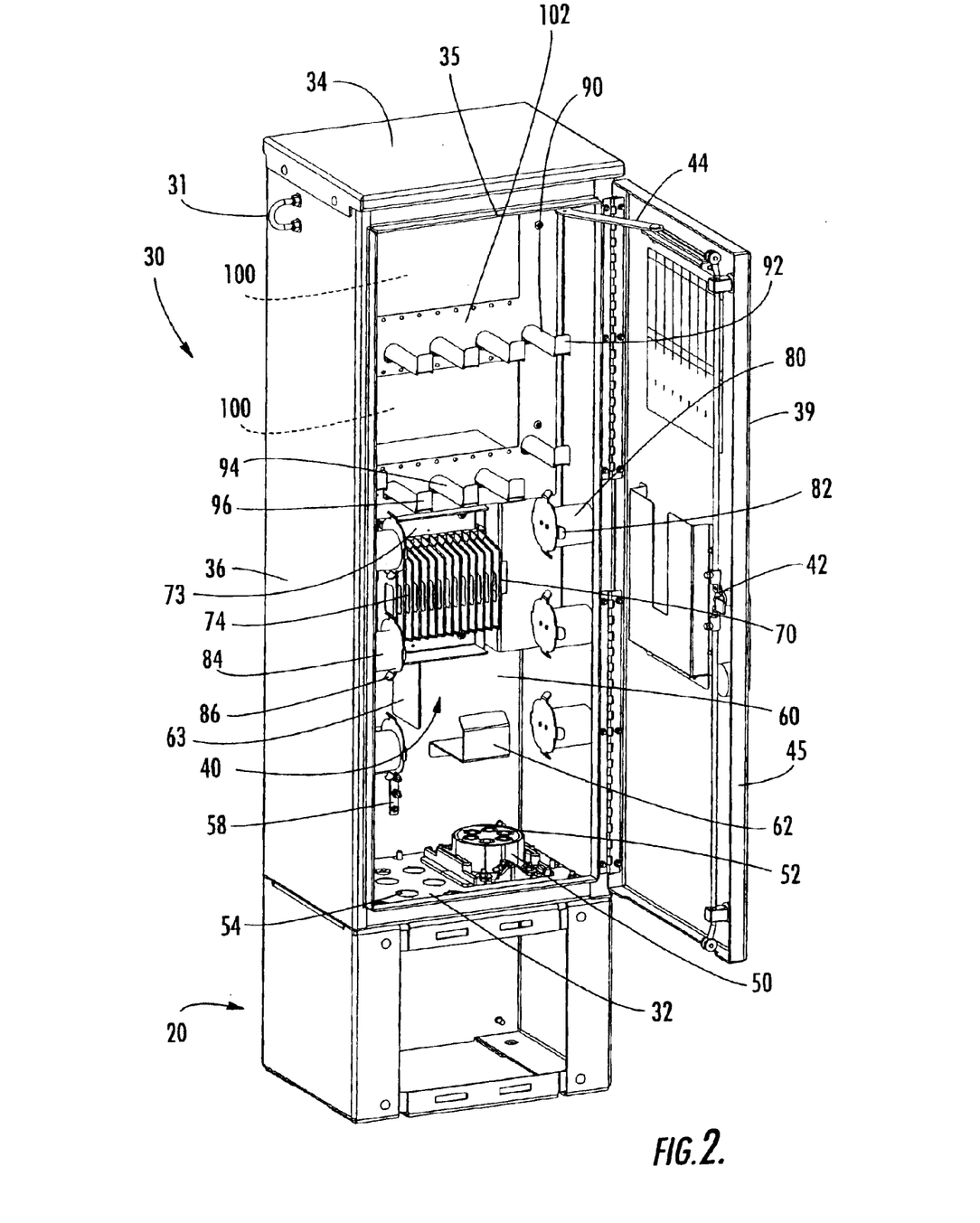
FIG. 2 is a front left perspective view of the interior compartment of the LCC of FIG. 1A shown with the feeder cable, distribution cable(s), feeder pigtail(s), distribution pigtail(s) and coupler module(s) removed for purposes of greater clarity.
Figure 3:
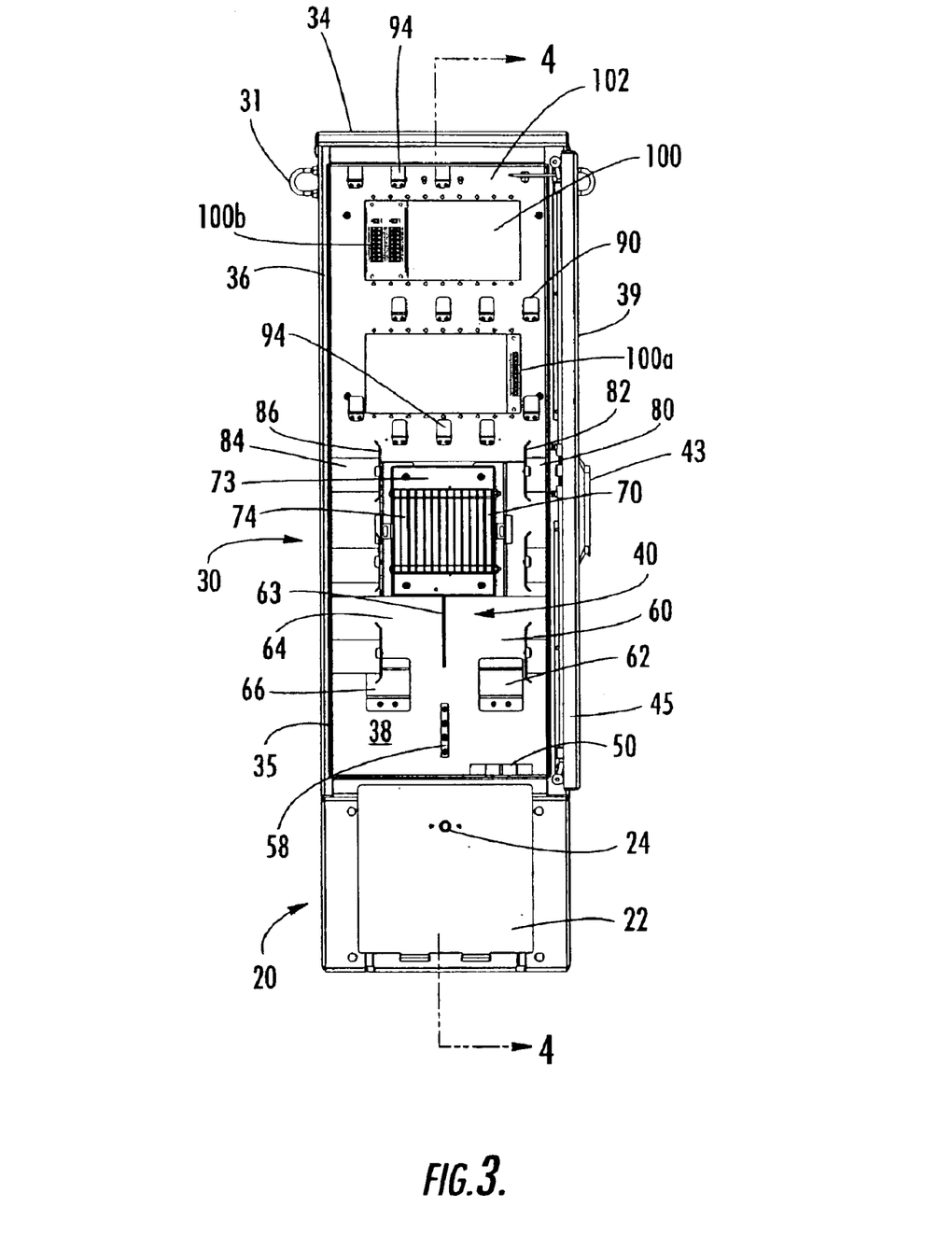
FIG. 3 is a front elevation view of the interior compartment of the LCC of FIG. 1A shown with the feeder cable, distribution cable(s), feeder pigtail(s) and distribution pigtail(s) removed for purposes of greater clarity and with an exemplary configuration of coupler modules installed therein.
Figure 4:
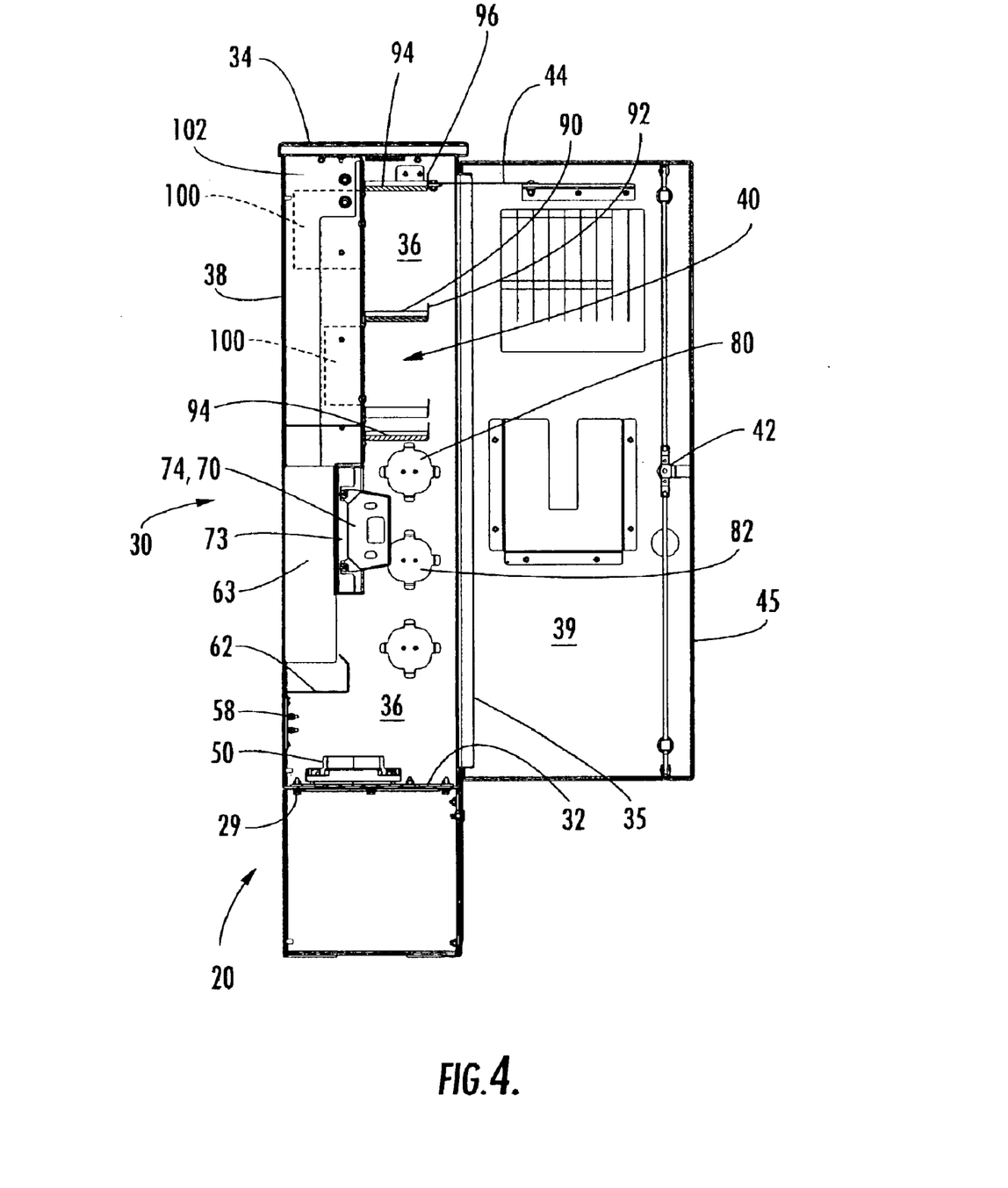
FIG. 4 is a lateral section view taken along line 4—4 of FIG. 3.

FIGS. 2–4 show the various components of the LCC 10 illustrated in FIGS. 1A and 1B. As shown in the exemplary embodiments described herein, the LCC 10 comprises an optional base 20 and a cabinet 30 positioned adjacent the top of the base 20. The base 20 is generally hollow and may be used to store relatively short slack lengths of the feeder cable 12 and/or the distribution cable(s) 16. The base 20 further provides a convenient location to securely mount one or more strain relief brackets (not shown) for strain relieving the feeder cable 12 and/or the distribution cable(s) 16. The base 20 also provides a mounting structure for securing the LCC 10 onto the concrete pad 11a when the LCC 10 is pad-mounted. The base 20 may be provided with a removable door or panel 22 (shown removed in FIG. 2 for purposes of greater clarity) to facilitate access to the interior of the base 20 in the pad-mounted or pole-mounted configuration. The access panel 22 may be hingedly attached to the base 20 for movement between an opened configuration and a closed configuration, or as shown herein, may be adapted to be removed entirely. The base 20 and/or the access panel 22 may comprise conventional fasteners or other means 24 for securing the panel 22 to the base 20 in the closed configuration. Furthermore, the access panel 22 may be lockable on the base 20 in the closed position to prevent unauthorized access to the feeder cable 12, the distribution cable(s) 16 and the entry ports into the cabinet 30 within the interior of the base 20. The base 20 and the cabinet 30 are made of a lightweight, yet structurally rigid material, such as plastic, composite (e.g., fiber and resin) or metal, and preferably, are made of thin sheet aluminum or steel. However, any relatively lightweight, substantially rigid, non-porous, flame and fire-resistant material is suitable. The remaining structural components of the LCC 10 likewise are made of a lightweight, yet rigid material. Furthermore, the base 20 or cabinet 30 may comprise vertical and/or lateral ribs (not shown) to strengthen and/or stiffen the LCC 10 in a particular direction. The cabinet 30 may be attached to the base 20 in any conventional manner, or the base 20 and the cabinet 30 may be integrally formed and separated by the bottom wall 32 of the cabinet 30. As best shown in FIG. 4, the base 20 and the cabinet 30 are provided with overlapping flanges that are secured together by fasteners 29, such as threaded bolts and nuts. One or more cable hoists 31 may also be provided on the base 20 and/or the cabinet 30 to assist in transporting and positioning the LCC 10 on the concrete pad or utility pole.

Cabinet 30 comprises bottom wall 32, top wall 34, side walls 36, back wall 38 and front door 39 that together define an interior compartment 40 for containing optical interconnection equipment as will be described hereinafter. Side walls 36 are laterally spaced apart and top wall 34 is vertically spaced from bottom wall 32 by side walls 36. Back wall 38 is secured to bottom wall 32, top wall 34 and side walls 36 opposite front door 39 to form a box-like enclosure. Front door 39 is preferably hinged to one of the side walls 36 and provided with a latching mechanism adapted to cooperate with the other side wall 36 to secure the front door 39 in a closed position. As shown, the front door 39 is provided with a conventional three-point latch 42 and a conventional friction slide 44 for holding the front door 39 in the opened position. A handle 43 on the exterior surface of the front door 39 cooperates with the latch 42 to open, close and/or lock the front door 39. The bottom wall 32, the top wall 34 and the side walls 36 each comprise an outwardly protruding flange 35 that cooperates with a corresponding flange 45 on the inside of the front door 39 to prevent water, for example blowing rain or melting snow, from entering the interior compartment 40 defined by the cabinet 30. An optional elastomeric gasket (not shown) may be provided between the flanges 35 and the flanges 45 to further seal the interior compartment 40 from adverse environmental effects, such as moisture, dust, dirt, and insect and rodent infestation, and thereby protect the components within the interior of the cabinet 30. As shown and described herein, the cabinet 30 has an upright, rectangular shape. However, the cabinet 30 may have any suitable shape for containing the required optical interconnection components, as will be described, and may even be shaped aesthetically to conform to the natural environment of the local access point in the optical network. For example, the cabinet 30 may be pad-mounted and formed in the shape of a boulder to blend into the landscape surrounding the local access point. Alternatively, the cabinet 30 may be pole-mounted and formed in the shape of the trunk of a tree. Regardless, the cabinet 30 defines the interior compartment 40 that houses the optical interconnection components necessary to interconnect an optical fiber of the feeder cable 12 with two or more optical fibers of the distribution cable 16. Importantly, the cabinet 30 separates the optical fibers of the feeder cable 12 from the optical fibers of the distribution cable(s) 16 so that the interior compartment 40 is both organized and space efficient, thereby optimizing the fiber capacity of the LCC 10. In addition, the cabinet 30 is configured to avoid entangling the optical fibers of the feeder cable 12 and the optical fibers of the distribution cable(s) 16, thereby enhancing fiber routing and fiber management. For example, one exemplary embodiment of the LCC 10 shown and described hereinafter is configured to interconnect up to 36 optical fibers of a feeder cable 12 with up to 144 optical fibers of at least one distribution cable 16. Another exemplary embodiment of the LCC 10 described and shown hereinafter is configured to interconnect up to 36 optical fibers of a feeder cable 12 with up to 192 optical fibers of at least one distribution cable 16.

As previously mentioned, the cabinet 30 comprises a bottom wall 32 that separates the interior of the base 20 from the interior compartment 40. As best shown in FIG. 2, the bottom wall 32 comprises a feeder cable port 50 in communication with the interior of the base 20 and the interior compartment 40 defined by the cabinet 30. The feeder cable port 50 is substantially disc-shaped and has at least one opening 52 for permitting a fiber optic cable to enter the interior compartment 40 from the base 20. As shown, the feeder cable port comprises openings 52 for receiving up to six feeder cables 12 without strain relief and up to four feeder cables 12 that are strain relieved. Preferably, the feeder cable 12 is passed through the opening 52, unsheathed (i.e., a portion of the outer jacket cut and removed) and strain relieved to a strain relief bracket (not shown) secured to the feeder cable port 50. The feeder cable port 50 may be formed of a foam material, or the openings 52 may be provided with elastomeric gaskets or other sealing material to seal the interior compartment 40 from adverse environmental effects, such as moisture, dust, dirt, and insect and rodent infestation, and thereby protect the components within the interior of the cabinet 30. The bottom wall 32 further comprises at least one distribution cable port defining an opening 54 for permitting a fiber optic cable to enter the interior compartment 40 from the base 20. As shown, the bottom wall 32 comprises openings 54 for receiving up to six distribution cables 16. Preferably, the distribution cable 16 is passed through the opening 54, unsheathed and adequately strain relieved to a strain relief bracket (not shown) secured to the bottom wall 32, a side wall 36 or the back wall 38. The openings 54 defined by the distribution cable ports may be provided with elastomeric gaskets or other sealing material to seal the interior compartment 40 from adverse environmental effects, such as moisture, dust, dirt, and insect and rodent infestation, and thereby protect the components within the interior of the cabinet 30. If necessary, the feeder cable 12 and/or the distribution cable 16 may be electrically connected to grounding bar 58, which in turn is connected to earth ground, in a known manner. Typically, the LCC 10 will be configured with a single feeder cable 12 and a plurality of distribution cables 16 comprising one or more drop cables or branch cables. For example, an opening 52 of the feeder cable port 50 may receive a main feeder cable 12 from the service provider and the openings 54 defined by the distribution cable port may receive one or more drop cables leading to a subscriber's premises, such as a home or business, and one or more branch cables leading to another LCC 10 along the optical network. Furthermore, the unused openings 52 and 54 are typically closed off so that the cabinet 30 defines a relatively water-tight enclosure for the optical fiber connections between the feeder cable 12 and the distribution cables 16. The specific configuration of the base 20, the feeder cable port 50, the openings 52 and the openings 54 is shown for purposes of illustration only, and is not intended to limit the scope of the invention in any way. The design and operability of the base 20, the feeder cable port 50, the openings 52, the openings 54, the strain relief brackets and the grounding bar 58 are known and form no part of the present invention.

As previously mentioned, the cabinet 30 has an upright, rectangular shape such that the bottom wall 32, the top wall 34, the side walls 36, the back wall 38 and the front door 39 define a box-like enclosure. For convenience, the dimension extending between the bottom wall 32 and the top wall 34 defines a vertical direction, the dimension extending between the side walls 36 defines a lateral direction, and the dimension extending between the front door 39 and the back wall 38 defines a depth direction. The feeder cable port 50 and the openings 54 of the distribution cable port are positioned on the bottom wall 32 medially between the front door 39 and the back wall 38. The bottom portion of the interior compartment 40 is divided laterally into a feeder cable side adjacent one side wall 36 and a distribution cable side adjacent the other side wall 36. As shown herein, the feeder cable side occupies the right-hand side of the bottom portion of the interior compartment 40 and the distribution cable side occupies the left-hand side of the bottom portion of the interior compartment 40 when viewed in the direction of the back wall 38. If desired, however, the feeder cable side and the distribution cable side may be reversed for convenience or to satisfy other requirements. It should be noted that the feeder cable port 50 is located within the feeder cable side of the interior compartment 40 and the distribution cable port (openings 54) are located within the distribution cable side of the interior compartment 40. As is conventional, each feeder cable 12 typically comprises a plurality of buffer tubes 13 and each buffer tube 13 typically comprises a plurality of individual optical fibers 14. Similarly, each distribution cable 16 typically comprises a plurality of buffer tubes 17 and each buffer tube 17 typically comprises a plurality of individual optical fibers 18. The slack lengths of buffer tubes 13 and any lengths of unused (a/k/a dark) buffer tubes 13 are stored in feeder slack storage area 60 located immediately above the feeder cable port 50 in the feeder cable side of the interior compartment 40. Similarly, the slack lengths of buffer tubes 17 and any lengths of unused (a/k/a dark) buffer tubes 17 are stored in feeder slack storage area 64 located immediately above the openings 54 of the distribution cable port in the distribution cable side of the interior compartment 40. The buffer tubes 13 are preferably coiled and supported on feeder slack storage bracket 62 between the back wall 38 and the splice tray stacker 73 to be described. Similarly, the buffer tubes 17 are preferably coiled and supported on distribution slack storage bracket 66 between the back wall 38 and the splice tray stacker 73. If desired, an optional separator flange 63 may be provided between the buffer tubes 13 and the buffer tubes 17 to prevent entangling of the feeder buffer tubes 13 and the distribution buffer tubes 17.

The feeder buffer tubes 13 having optical fibers 14 to be interconnected with optical fibers 18 of the distribution buffer tubes 17 are routed to at least one feeder splice tray 70 located immediately above the feeder slack storage area 60. Similarly, the distribution buffer tubes 17 having optical fibers 18 are routed to at least one distribution splice tray 74 located immediately above the distribution slack storage area 64. The buffer tubes 13, 17 may be routed to the feeder splice trays 70 and the distribution splice trays 74, respectively, utilizing appropriately sized radius guides (not shown) to maintain the minimum bend radius of the optical fibers 14, 18 within the buffer tubes 13, 17. As shown herein in FIG. 5, however, the buffer tubes 13 are routed directly to the feeder splice trays 70 and the buffer tubes 17 are routed directly to the distribution splice trays 74. As will be readily apparent, substantially fewer optical fibers 14 (i.e., "feeder" or "input" optical fibers) from buffer tubes 13 will be utilized than optical fibers 18 (i.e., "distribution" or "output" optical fibers) from buffer tubes 17. In the specific examples described hereinafter, only 36 optical fibers 14 from buffer tubes 13 are utilized to interconnect up to 144 or 192 optical fibers 18 from buffer tubes 17. Accordingly, fewer feeder splice trays 70 than distribution splice trays 74 are typically required. As a result, a portion of the distribution splice trays 74 may need to be located in the feeder cable side of the interior compartment 40. Alternatively, the spliced optical connections of the optical fibers 14 and the spliced optical connections of the optical fibers 18 may be distributed more or less evenly throughout a plurality of combined feeder and distribution splice trays. In general, however, the optical fibers 14 of the buffer tubes 13 from the feeder cable 12 will be routed to feeder splice trays 70 located in the feeder cable side of the interior compartment 40 and the optical fibers 18 of the buffer tubes 17 from the distribution cable 16 will be routed to distribution splice trays 74 located in the distribution cable side of the interior compartment 40. The splice trays 70, 74 may secured in the interior compartment 40 in any suitable manner. As shown herein, the splice trays 70, 74 are mounted on splice tray stacker 73 located medially between the side walls 36 and medially between the front door 39 and the back wall 38. If desired, the splice tray stacker 73 may be located such that the splice trays 70, 74 are positioned closer to the front door 38 to provide additional space in the depth direction for the feeder slack storage area 60 and the distribution slack storage area 64. In any instance, the splice trays 70, 74 may be secured to the splice tray stacker 73 by a strap comprising "hook and loop" (i.e., VELCRO) type fasteners. As shown, the splice trays 70, 74 are somewhat smaller in size than conventional splice trays due to the limited amount of space available in the lower portion of the interior compartment 40 of the cabinet 30. Nevertheless, the splice trays 70, 74 are configured to accommodate up to 24 separate spliced optical connections between the optical fibers 14, 18 from the buffer tubes 13, 17 and corresponding pigtails 15, 19, as will be described.

The feeder splice trays 70 are adapted to connect (i.e., splice) the optical fibers 14 of the buffer tubes 13 from the feeder cable 12 to a plurality of feeder pigtails 15 in a one-to-one relationship. Similarly, the distribution splice trays 74 are adapted to connect (i.e., splice) the optical fibers 18 of the buffer tubes 17 from the distribution cable 16 to a plurality of distribution pigtails 19 in a one-to-one relationship. The feeder pigtails 15 are routed from the feeder splice trays 70 to one or more coupler modules 100 located in the upper portion of the interior compartment 40. In FIG. 2, the interior compartment 40 of the LCC 10 is shown with the feeder cable 12, the distribution cable 16, the feeder buffer tubes 13, the distribution buffer tubes 17, the pigtails 15, the distribution pigtails 19 and coupler modules 100 removed for purposes of greater clarity. In FIG. 3, only a single coupler module 100a of a type to be described hereinafter and a single coupler module 100b of a type to be described hereinafter are shown mounted in the upper portion of the interior compartment 40 for purposes of greater clarity. Preferably, each of the feeder pigtails 15 and the distribution pigtails 19 has the same length for ease of manufacture and cost reduction. Any slack length of the feeder pigtails 15 is looped around an appropriate feeder radius control guide 80 and the feeder pigtail 15 is then routed along feeder routing guides 90 to the appropriate coupler module 100. The feeder radius control guides 80 are mounted to the right-hand side wall 36 in the feeder cable side of the interior compartment 40 medially between the front door 39 and the back wall 38. Each radius control guide 80 is generally cylindrical and has a radius at least equal to the minimum bend radius of the feeder pigtails 15. Furthermore, each feeder radius control guide 80 is provided with a radially extending outer flange 82 to retain the feeder pigtail 15 on the radius control guide 80. The feeder routing guides 90 are mounted to the back wall 38, or as shown herein, to a coupler module housing 102 secured to the back wall 38 or to the side walls 36. The feeder routing guides 90 are located adjacent the right-hand side wall 36 and between the lower and upper rows of coupler modules 100, as will be described. Each routing guide 90 is generally semi-cylindrical and has a radius at least equal to the minimum bend radius of the feeder pigtails 15. Furthermore, each feeder routing guide 90 is provided with an upwardly extending outer flange 92 to retain the feeder pigtail 15 on the routing guide 90. Similarly, any slack length of the distribution pigtails 19 is looped around an appropriate distribution radius control guide 84 and the distribution pigtail 19 is then routed along distribution routing guides 94 to the appropriate coupler module 100. The distribution radius control guides 84 are mounted to the left-hand side wall 36 in the distribution cable side of the interior compartment 40 medially between the front door 39 and the back wall 38. Each radius control guide 84 is generally cylindrical and has a radius at least equal to the minimum bend radius of the distribution pigtails 19. Furthermore, each distribution radius control guide 84 is provided with a radially extending outer flange 86 to retain the distribution pigtail 19 on the radius control guide 84. The distribution routing guides 94 are mounted to the back wall 38, or as shown herein, to the coupler module housing 102 secured to the back wall 38 or to the side walls 36. The distribution routing guides 94 are located adjacent the left-hand side wall 36, below the lower row of coupler modules 100, and above the upper row of coupler modules 100, as will be described. Each routing guide 94 is generally semi-cylindrical and has a radius at least equal to the minimum bend radius of the distribution pigtails 19. Furthermore, each distribution routing guide 94 is provided with an upwardly extending outer flange 96 to retain the distribution pigtail 19 on the routing guide 96.

FIG. 5 shows an exemplary embodiment of an LCC 10 according to the invention and illustrates an exemplary method of managing and routing a feeder cable 12, a distribution cable 16, feeder buffer tubes 13, distribution buffer tubes 17, feeder pigtails 15 and distribution pigtails 19. As used herein, the term "pigtails" refers to a single optical fiber that is pre-connectorized on at least one end. The pigtails 15, 19 comprise optical fibers that are spliced at one end to optical fibers 14, 18 within splice trays 70, 74 and are pre-connectorized on the opposite end. As used herein, the terms "pre-connectorized" and "connectorized" refer to an optical fiber having a connector at one end that can be interconnected with another optical fiber through a fiber optic adapter. A pigtail permits a field technician to readily reconfigure the optical connections within the LCC 10 without having the skill necessary to accomplish a spliced optical connection. It should be noted that the LCC 10 may be initially configured with a predetermined number of feeder splice trays 70 a predetermined number of feeder pigtails 15, a predetermined number of distribution splice trays 74 and a predetermined number of distribution pigtails 19. The communications service provider may then purchase an initial number of coupler modules 100 and later purchase additional coupler modules 100 as the demand for high bandwidth communications service grows. The unused (a/k/a dark) feeder pigtails 15 and distribution pigtails 19 are then bundled and stored in a convenient location within the cabinet 30, for example on radius control guides 80, 84, respectively. In a particular example, the communications service provider could initially configure the LCC 10 with three feeder splice trays 70, each accommodating 12 spliced optical connections, 36 feeder pigtails 15, six distribution splice trays, each accommodating 24 spliced optical connections, and 144 distribution pigtails 19. The communications service provider would then purchase an initial number of coupler modules 100a, for example six, install them in any of the available slots in the coupler module housing 102, and interconnect up to two of the feeder pigtails 15 with up to eight of the distribution pigtails 19 in each coupler module 100a. The communications service provider could then later purchase additional coupler modules and interconnect additional feeder pigtails 15 and distribution pigtails 19 as desired. The feeder cable 12 and the distribution cable(s) 16 may also be pre-stubbed with the optical fibers 14, 18 of the buffer tubes 13, 17 spliced to the feeder pigtails 15 and the distribution pigtails 19 respectively.

Referring to FIG. 5, a feeder cable 12 is shown entering the interior compartment 40 of the cabinet 30 through the feeder cable port 50. The feeder cable 12 is strain relieved (not shown) and unsheathed to expose at least one feeder buffer tube 13. Any slack length of the feeder buffer tube 13 is routed behind the splice tray stacker 73 and looped onto the feeder slack storage bracket 62. The feeder buffer tube 13 is then routed to one of the feeder splice trays 70 and unsheathed to expose a plurality of optical fibers 14 (four shown). The optical fibers 14 are spliced within the feeder splice tray 70 to feeder pigtails 15. The feeder pigtails 15 (four shown) exit the feeder splice tray 70 and any slack length is routed around one or more of the feeder radius control guides 80 to the feeder routing guides 90 located on the coupler module housing 102 between the upper and lower rows of coupler modules 100a. As depicted, two of the feeder pigtails 15 are routed to a coupler module 100a in the lower row and two of the feeder pigtails 15 are routed to a coupler module 100a in the upper row. Similarly, a distribution cable 16 is shown entering the interior compartment 40 of the cabinet 30 through the one of the openings 54 defined by the distribution cable port. The distribution cable 16 is strain relieved (not shown) and unsheathed to expose at least one distribution buffer tube 17. Any slack length of the distribution buffer tube 17 is routed behind the splice tray stacker 73 and looped onto the distribution slack storage bracket 66. The distribution buffer tube 17 is then routed to one of the distribution splice trays 74 and unsheathed to expose a plurality of optical fibers 18 (sixteen shown). The optical fibers 18 are spliced within the distribution splice tray 74 to distribution pigtails 19. The distribution pigtails 19 (sixteen shown) exit the distribution splice tray 74 and any slack length is routed around one or more of the distribution radius control guides 84 to the distribution routing guides 94 located on the coupler module housing 102 above and below the rows of coupler modules 100a. As depicted, eight of the distribution pigtails 19 are routed to a coupler module 100a in the lower row and eight of the distribution pigtails 19 are routed to a coupler module 100a in the upper row.

Figure 6A:
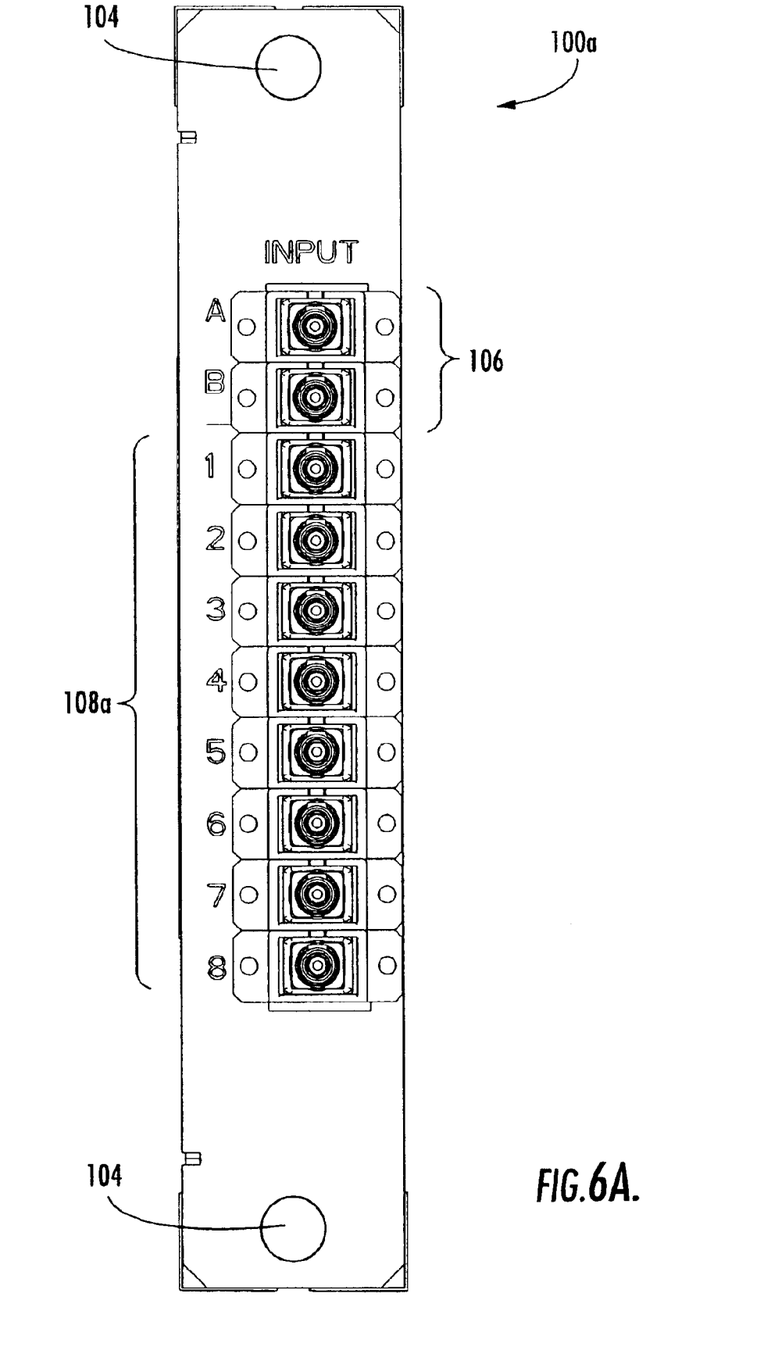
FIG. 6A is a front elevation view of an exemplary embodiment of a coupler module for use with the LCC of FIG. 1A.

FIG. 6A shows an exemplary embodiment of a coupler module 100a suitable for use with an LCC 10 according to the invention. The coupler module 100a is installed into coupler module housing 102 located in the upper portion of the cabinet 30. The coupler module 100a is installed within a lower opening or an upper opening provided in the coupler module housing 102 that is sized to receive up to nine individual coupler modules 100a. The coupler module 100a may be secured within the coupler module housing 102 in any suitable manner. As shown, the coupler module 100a comprises fasteners 104, commonly referred to as "plungers" or "push pins," that cooperate with the coupler module housing 102 to removably secure the coupler module 100a to the coupler module housing 102. Accordingly, a highly skilled field technician is not required to install, remove and replace the coupler module 100a. The coupler module 100a further comprises at least one feeder adapter 106 for receiving a feeder pigtail 15 and at least two distribution adapters 108a for receiving distribution pigtails 19. As shown, the coupler module 100a comprises two feeder adapters 106 identified as "INPUT A" and "INPUT B" and eight distribution adapters 108a with individual adapters identified by Arabic numbers 1–8. Preferably, the feeder adapters 106 and the distribution adapters 108a are "plug-and-play" type fiber optic adapters that are readily connected and disconnected in the field. Accordingly, a highly skilled field technician is not required to install and reconfigure the adapters 106, 108a. Each of the feeder adapters 106 receives a feeder pigtail 15 comprising an optical fiber 14 carrying an optical signal. The coupler module 100a "splits" the optical signal carried on each optical fiber 14 into four separate optical signals. Each of the distribution adapters 108a receives a distribution pigtail 19 comprising an optical fiber 18 that carries an optical signal split from the optical signal carried by one of the optical fibers 14 of a feeder pigtail 15. Accordingly, the coupler module 100a shown herein is referred to as comprising two 1×4 splitters. Obviously, the coupler module 100a may comprise any convenient number of feeder adapters 106 and distribution adapters 108a. For example, the coupler module 100a may comprise one feeder adapter 106 and eight distribution adapters 108a (i.e., a 1=8 splitter).

When fully populated with the coupler modules 100a shown and described herein, the LCC 10 has a fiber capacity of up to 144 optical fibers 18.

Figure 6B:
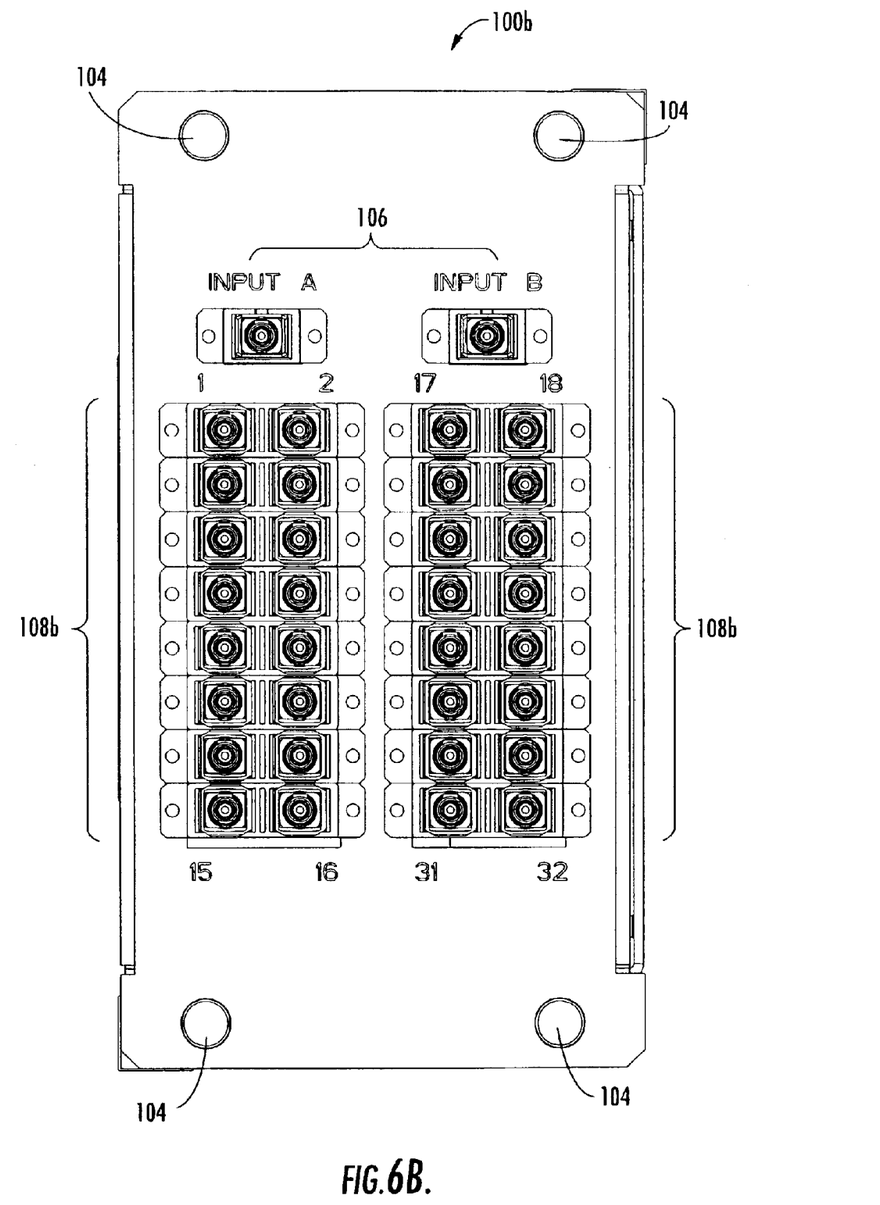
FIG. 6B is a front elevation view of another exemplary embodiment of a coupler module for use with the LCC of FIG. 1A.

FIG. 6B shows another exemplary embodiment of a coupler module 100b suitable for use with an LCC 10 according to the invention. The coupler module 100b is installed into coupler module housing 102 located in the upper portion of the cabinet 30. The coupler module 100b is installed within a lower opening or an upper opening provided in the coupler module housing 102 that is sized to receive up to three individual coupler modules 100b. The coupler module 100b may be secured within the coupler module housing 102 in any suitable manner. As shown, the coupler module 100b comprises fasteners 104, commonly referred to as "plungers" or "push pins," that cooperate with the coupler module housing 102 to removably secure the coupler module 100b to the coupler module housing 102. Accordingly, a highly skilled field technician is not required to install, remove and replace the coupler module 100b. The coupler module 100b further comprises at least one feeder adapter 106 for receiving a feeder pigtail 15 and at one duplex distribution adapter 108b for receiving distribution pigtails 19. As shown, the coupler module 100b comprises two feeder adapters 106 identified as "INPUT A" and "INPUT B" and sixteen distribution adapters 108b with individual adapters identified by Arabic numbers 1–32. Preferably, the feeder adapters 106 and the distribution adapters 108b are "plug-and-play" type fiber optic adapters that are readily connected and disconnected in the field. Accordingly, a highly skilled field technician is not required to install and reconfigure the adapters 106, 108b. Each of the feeder adapters 106 receives a feeder pigtail 15 comprising an optical fiber 14 carrying an optical signal. The coupler module 100b "splits" the optical signal carried on each optical fiber 14 into sixteen separate optical signals. Each of the distribution adapters 108b receives a distribution pigtail 19 comprising an optical fiber 18 that carries an optical signal split from the optical signal carried by one of the optical fibers 14 of a feeder pigtail 15. Accordingly, the coupler module 100b shown herein is referred to as comprising two 1×16 splitters. Obviously, the coupler module 100b may comprise any convenient number of feeder adapters 106 and distribution adapters 108b. For example, the coupler module 100b may comprise one feeder adapter 106 and thirty-two distribution adapters 108b (i.e., a 1×32 splitter). When fully populated with the coupler modules 100b shown and described herein, the LCC 10 has a fiber capacity of up to 192 optical fibers 18.

The exemplary embodiments of the LCC 10 shown and described herein provide a number of significant advantages over previously known enclosures, such as conventional communications cabinets. For purposes of example only, and not by way of limitation, an LCC 10 constructed in accordance with the invention provides substantially greater fiber capacity than a conventional communications cabinet as a result of the incorporation of coupler modules 100. Furthermore, an LCC 10 constructed in accordance with the invention provides substantially greater fiber capacity as a result of the efficient use of the space available within the cabinet 30 for the fiber storage, fiber management, fiber splicing and fiber coupling components. Still further, an LCC 10 constructed in accordance with the invention permits a field technician with less skill to install and reconfigure the optical connections within the LCC 10 with greater ease and flexibility. Still further, an LCC 10 constructed in accordance with the invention permits an optical fiber from a feeder cable to be interconnected with two or more optical fibers of a distribution cable. In an alternative embodiment, one or more of the splice trays may be removed from the LCC 10 and a technician may field terminate at least one connectorized optical fiber from a feeder cable with two or more connectorized optical fibers from a distribution cable, or with two or more optical fibers from a distribution cable through at least one mechanical splice tray.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that further modifications and other embodiments are intended to be included within the scope of the appended claims. Although specific terms are employed herein, they are used in a generic and descriptive sense only and not for purposes of limitation.

That which is claimed is:

1. An enclosure for interconnecting at least one optical fiber of a feeder cable with two or more optical fibers of a distribution cable, the enclosure comprising:
    a cabinet defining a vertical direction, a lateral direction and an interior compartment comprising a feeder cable side and a distribution cable side positioned laterally adjacent the feeder cable side;
    at least one feeder cable port in communication with the interior compartment and defining at least one opening therethrough for receiving the feeder cable;
    at least one distribution cable port in communication with the interior compartment and defining at least one opening therethrough for receiving the distribution cable;
    a feeder cable slack storage area for storing slack lengths of the feeder cable within the feeder cable side of the interior compartment;
    a distribution cable slack storage area for storing slack lengths of the distribution cable within the distribution cable side of the interior compartment;
    a fiber splicing area comprising at least one splice tray for splicing the optical fiber of the feeder cable to a feeder pigtail and the optical fibers of the distribution cable to distribution pigtails; and
    a fiber coupling area comprising at least one coupler module for splitting an optical signal carried by the feeder pigtail into optical signals carried by the distribution pigtails.

2. An enclosure according to claim 1 wherein the feeder pigtail and the distribution pigtails are connectorized and wherein the coupler module comprises a feeder adapter for receiving the feeder pigtail and a pair of distribution adapters for receiving the distribution pigtails.

3. An enclosure according to claim 2 wherein the fiber coupling area comprises a plurality of coupler modules each removably attached to a coupler module housing.

4. An enclosure according to claim 3 wherein each of the coupler modules is retained within the coupler module housing such that the coupler modules are generally parallel to the vertical direction defined by the cabinet and generally perpendicular to the lateral direction defined by the cabinet.

5. An enclosure according to claim 3 wherein at least one of the coupler modules comprises two feeder adapters and eight distribution adapters.

6. An enclosure according to claim 3 wherein at least one of the coupler modules comprises two feeder adapters and sixteen duplex distribution adapters.

7. An enclosure according to claim 1 further comprising at least one feeder radius control guide for routing a slack length of the feeder pigtail between the splice tray and the coupler module and at least one distribution radius control guide for routing slack lengths of the distribution pigtails between the splice tray and the coupler module.

8. An enclosure according to claim 1 further comprising at least one feeder routing guide for guiding the feeder pigtail between the splice tray and the coupler module and at least one distribution routing guide for guiding the distribution pigtails between the splice tray and the coupler module.

9. An enclosure according to claim 8 wherein the fiber coupling area comprises a plurality of coupler modules installed within a coupler module housing defining a lower row of the coupler modules and an upper row of the coupler modules and wherein a plurality of the feeder routing guides are located between the lower row and the upper row and wherein a plurality of the distribution routing guides are located below the lower row and above the upper row.

10. An enclosure according to claim 1 wherein the feeder cable side and the distribution cable side are located in a lower portion of the interior compartment and wherein the splice tray and the coupler module are located in an upper portion of the interior compartment.

11. An enclosure according to claim 1 wherein the splice tray comprises at least one feeder splice tray for splicing the optical fiber of the feeder cable to the feeder pigtail within the feeder cable side of the interior compartment and at least one distribution splice tray for splicing the optical fibers of the distribution cable to the distribution pigtails within the distribution cable side of the interior compartment.

12. An enclosure according to claim 1 wherein the cabinet comprises a lower wall, a pair of laterally spaced side walls, an upper wall spaced from the lower wall by the side walls and a back wall.

13. An enclosure according to claim 12 wherein the feeder cable side is located adjacent one of the side walls and the distribution cable side is located adjacent the other side wall.

14. An enclosure according to claim 12 further comprising a base removably attached to the lower wall of the cabinet and wherein the feeder cable port and the distribution cable port are each in communication with the base and the cabinet.

15. An enclosure for splitting an optical signal carried by an input optical fiber of a first fiber optic cable into optical signals carried by two or more output optical fibers of at least one second fiber optic cable and for interconnecting the input optical fiber and the output optical fibers, the enclosure comprising:
    a cabinet defining a vertical direction, a lateral direction and an interior compartment;
    a cable entry area comprising a cable port in communication with the interior compartment and defining at least one opening therethrough adapted for receiving the first fiber optic cable and the second fiber optic cable;
    a cable slack storage area adapted for storing slack lengths of the first fiber optic cable and the second fiber optic;
    a fiber splicing area comprising at least one splice tray for splicing the input optical fiber of the first fiber optic cable to a first pigtail and splicing the output optical fibers of the at least one distribution cable to second pigtails; and
    a fiber coupling area comprising at least one coupler module for splitting an optical signal carried by the first pigtail into optical signals carried by the second pigtails;

wherein the cable entry area and the cable slack storage area are located in a lower portion of the cabinet and the fiber splicing area and the fiber coupling area are located in an upper portion of the cabinet spaced vertically from the lower portion.

16. An enclosure according to claim 15 wherein the cable entry area comprises a first cable port and a second cable port spaced laterally from the first cable port and wherein the cable slack storage area comprises a first cable slack storage area for storing slack lengths of the first fiber optic cable and a second cable slack storage area for storing slack lengths of the second fiber optic cable, the second cable slack storage area spaced laterally from the first cable slack storage area.

17. An enclosure according to claim 15 wherein the fiber coupling area comprises a plurality of coupler modules removably attached to a coupler module housing.

18. An enclosure according to claim 15 wherein the input optical fiber and the output optical fibers are pre-connectorized and wherein the coupler module comprises a plurality of adapters for receiving the pre-connectorized input optical fiber and the pre-connectorized output optical fibers.

19. An enclosure according to claim 15 wherein the first fiber optic cable is a feeder cable and the input optical fiber is a pre-connectorized feeder pigtail and wherein the at least one second fiber optic cable is a distribution cable and the output optical fibers are pre-connectorized distribution pigtails.

20. A method for interconnecting an optical fiber of a feeder cable and at least two optical fibers of a distribution cable, the feeder cable comprising at least one feeder buffer tube comprising the optical fiber of the feeder cable and the distribution cable comprising at least one distribution buffer tube comprising the two optical fibers of the distribution cable, the method comprising:

providing a cabinet defining an interior compartment and comprising at least one cable entry port, at least one splice tray and at least one coupler module;

routing the feeder cable and the distribution cable through the cable entry port into the interior compartment;

routing the feeder buffer tube of the feeder cable from the cable entry port to the splice tray and routing the distribution buffer tube of the distribution cable from the cable entry port to the splice tray;

splicing the optical fiber of the feeder cable to a feeder pigtail and slicing the optical fibers of the distribution cable to distribution pigtails;

routing the feeder pigtail and the distribution pigtails to the coupler module; and using the coupler module to split an optical signal carried by the optical fiber of the feeder cable into optical signals carried by the optical fibers of the distribution cable.

* * * * *